United States Patent
Lois et al.

(10) Patent No.: US 10,986,509 B1
(45) Date of Patent: Apr. 20, 2021

(54) PLACEMENT OF ANTENNAS FOR FIFTH GENERATION (5G) OR OTHER NEXT GENERATION NETWORKS

(71) Applicant: AT&T Intellectual Property I, L.P., Atlanta, GA (US)

(72) Inventors: Brian Lois, McKinney, TX (US); Jeffrey B. Saxon, Rockwall, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/931,844

(22) Filed: May 14, 2020

(51) Int. Cl.
| | |
|---|---|
| H04W 40/00 | (2009.01) |
| H04W 16/18 | (2009.01) |
| H04W 84/04 | (2009.01) |
| H04M 1/725 | (2021.01) |
| H04W 88/02 | (2009.01) |

(52) U.S. Cl.
CPC ........ *H04W 16/18* (2013.01); *H04M 1/72519* (2013.01); *H04M 1/72522* (2013.01); *H04W 84/042* (2013.01); *H04W 88/02* (2013.01)

(58) Field of Classification Search
CPC ... H04W 16/18; H04W 84/042; H04W 88/22; H04W 8/245; H04M 1/72519; H04M 1/72522
USPC .......................... 455/446, 67.11, 550.1, 418
See application file for complete search history.

(56) References Cited

U.S. PATENT DOCUMENTS

| | | | |
|---|---|---|---|
| 5,987,328 A | 11/1999 | Ephremides et al. | |
| 6,111,857 A | 8/2000 | Soliman et al. | |
| 6,128,474 A * | 10/2000 | Kim ..................... | H04B 17/103 455/67.11 |

(Continued)

FOREIGN PATENT DOCUMENTS

| | | |
|---|---|---|
| WO | 2006011866 A2 | 8/2006 |
| WO | 2016055024 A1 | 4/2016 |

OTHER PUBLICATIONS

Lui, et al., "An Efficient Geometry-Induced Genetic Algorithm for Base Station Placement in Cellular Networks." IEEE Access, Aug. 5, 2019, https://ieeexplore.ieee.org/stamp/stamp.jsp?tp=&arnumber=8788518. 18 pages.

(Continued)

*Primary Examiner* — Danh C Le
(74) *Attorney, Agent, or Firm* — Amin, Turocy & Watson, LLP

(57) ABSTRACT

The technologies described herein are generally directed to facilitating operation of a system for implementing fifth generation (5G) or other next generation networks. In accordance with one or more embodiments, systems described herein can include a processor, and a memory that can store executable instructions that can facilitate receiving, from a second device, information corresponding to iterations of ones of a sited group of antennas generated by the second device by selecting the iterations of ones of the sited group of antennas, with a selected iteration of the selected iterations including a subgroup of the sited group of antennas that is designated for a simulation of an operation of the sub- (Continued)

group. Further, the operations include simulating respective operations of the selected iterations, including propagation mapping with respect to respective wireless signals associated with the selected iterations, and estimating respective utilizations of the respective wireless signals.

20 Claims, 10 Drawing Sheets

(56) References Cited

U.S. PATENT DOCUMENTS

| | | | | |
|---|---|---|---|---|
| 6,356,758 | B1* | 3/2002 | Almeida | H04W 16/18 455/422.1 |
| 7,372,404 | B2* | 5/2008 | Shirai | G01S 3/74 342/417 |
| 9,113,353 | B1* | 8/2015 | Cotanis | H04W 16/18 |
| 9,167,386 | B2 | 10/2015 | Valaee et al. | |
| 9,258,199 | B2 | 2/2016 | Kalika et al. | |
| 9,426,674 | B2 | 8/2016 | Pulleti et al. | |
| 9,930,537 | B2 | 3/2018 | Ljung et al. | |
| 10,117,109 | B2 | 10/2018 | Madaiah et al. | |
| 10,306,480 | B2 | 5/2019 | Vanhatupa et al. | |
| 10,405,219 | B2 | 9/2019 | Feldkamp | |
| 10,531,309 | B1 | 1/2020 | Li et al. | |
| 2001/0051503 | A1 | 12/2001 | Lush | |
| 2005/0143077 | A1 | 6/2005 | Charbonneau | |
| 2009/0102610 | A1* | 4/2009 | Lance | G06K 7/10346 340/10.2 |
| 2009/0185502 | A1 | 7/2009 | Sung et al. | |
| 2010/0305931 | A1 | 12/2010 | Fordham | |
| 2014/0078880 | A1* | 3/2014 | Bhattad | H04B 7/0854 370/203 |
| 2014/0357284 | A1 | 12/2014 | Almoghathawi et al. | |
| 2015/0296388 | A1 | 10/2015 | Bassiri et al. | |
| 2016/0087701 | A1* | 3/2016 | Wu | H04B 7/0456 375/267 |
| 2016/0127055 | A1* | 5/2016 | Dayal | H04L 5/0091 370/252 |
| 2017/0054607 | A1 | 2/2017 | Madaiah et al. | |
| 2017/0331531 | A1* | 11/2017 | Wu | H04L 25/03898 |
| 2018/0184303 | A1 | 6/2018 | Egner et al. | |
| 2018/0198515 | A1* | 7/2018 | Lotter | H04B 7/0842 |
| 2019/0190143 | A1* | 6/2019 | Moilanen | H01Q 9/0407 |
| 2019/0222652 | A1 | 7/2019 | Graefe et al. | |
| 2019/0342763 | A1 | 11/2019 | Jung et al. | |
| 2020/0106496 | A1* | 4/2020 | Kagitapu | H04W 88/02 |

OTHER PUBLICATIONS

Han, et al "Genetic approach with a new representation for base station placement in mobile communications." [IEEE IEEE 54th Vehicular Technology Conference. VTC Fall 2001. Proceedings—Atlantic City, NJ, USA (Oct. 7-11, 2001). 5 pages.

Rezaabad, et al. "Ultra-Dense 5G Small Cell Deployment for Fiber and Wireless Backhaul-Aware Infrastructures." arXiv:1808.01297v2 [cs.NI] Aug. 22, 2018. 14 pages.

Yuce "A Planning and Optimization Framework for Hybrid Ultra-Dense Network Topologies." https://aaltodoc.aalto.fi/handle/123456789/31522. Last Accessed Apr. 22, 2020 78 pages.

Yuce, et al. "A planning and optimization framework for hybrid ultra-dense network topologies," Published in Proceedings of the 22nd Conference of Open Innovations Association FRUCT, FRUCT 2018, https://research.aalto.fi/files/31418415/ELEC_Yuce_planning_and_optimization_fruct.pdf. 11 pages.

Munyaneza, et al. "Optimization of antenna placement in 3G networks using genetic algorithms." 2008 Third International Conference on Broadband Communications, Information Technology & Biomedical Applications. IEEE, 2008. 8 pages.

Ting, et al. "Wireless heterogeneous transmitter placement using multiobjective variable-length genetic algorithm." IEEE Transactions on Systems, Man, and Cybernetics, Part B (Cybernetics) 39.4 (2009): 945-958. 14 pages.

Valavanis, et al. "Base-station location optimization for LTE systems with genetic algorithms." European Wireless 2014; 20th European Wireless Conference. VDE, 2014. 7 pages.

Sakthivel, et al. "A genetic algorithm approach to solve mobile base station location problem." International Journal of Soft Computing 1.3 (2006): 160-165. 6 pages.

\* cited by examiner

US 10,986,509 B1

PLACEMENT OF ANTENNAS FOR FIFTH GENERATION (5G) OR OTHER NEXT GENERATION NETWORKS

TECHNICAL FIELD

The subject application is related to implementation of 5G or other next generation wireless communication systems, and, for example, placement of antennas used to implement next generation networks.

BACKGROUND

To continue supporting next generations of mobile devices, radio access networks are constantly evolving to include new and different types of hardware. Antennas, for example, are included in some modern networks with designs that support much higher-bandwidth than have been widely employed in previous generations of wide area networks. In some implementations, a much larger number of these high-bandwidth antennas are used to provide network coverage. Problems can occur however, when conventional approaches are used to design these networks.

For example, for newer high-bandwidth millimeter wave transmitters, in some network implementations, one hundred or more transmitters per square mile can be sited for network coverage. With current manual approaches, only a small number of such networks can be evaluated. Without rapid evaluation of many different implementations, network designs with high levels of efficient coverage may be missed.

The above-described background relating to network hardware is merely intended to provide a contextual overview of some current issues, and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
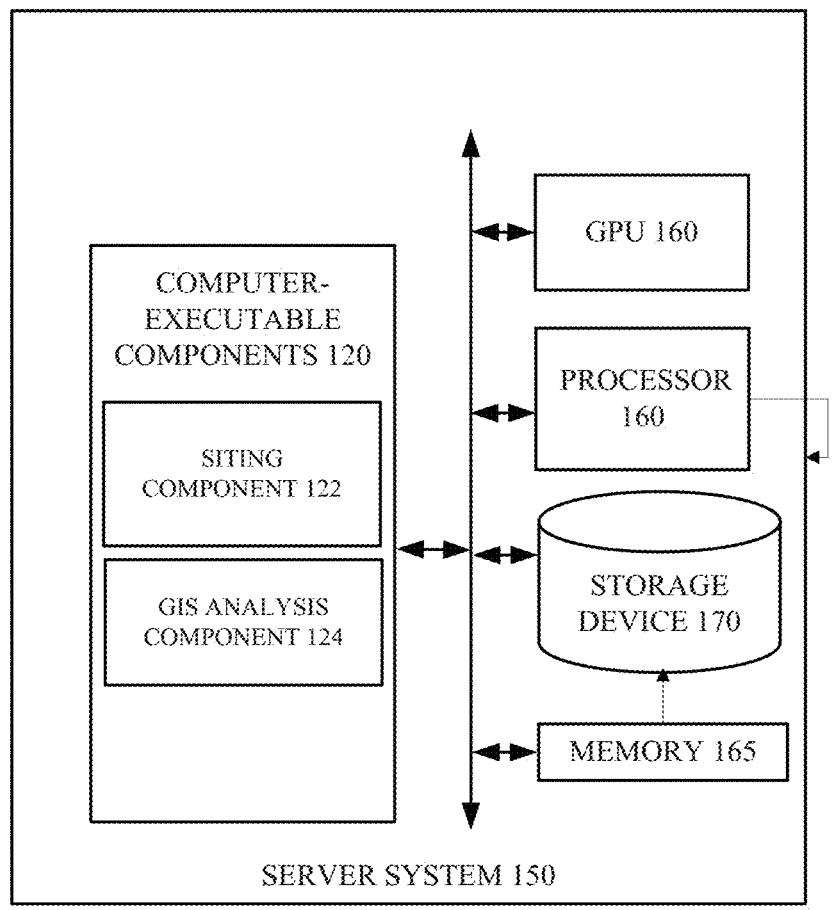
FIG. 1 is an architecture diagram of an example system that can facilitate implementation of a cellular network in a given geographic area by identifying candidate sites for placement of antenna, in accordance with one or more embodiments.

Generally speaking, one or more embodiments described herein can facilitate implementation of a cellular network in a given geographic area. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g. long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g. LTE.

The computer processing systems, computer-implemented methods, apparatus and/or computer program products described herein employ hardware and/or software to solve problems that are highly technical in nature (e.g., decoding wireless signals to determine patient information, rapidly analyzing different treatment options, and allocating network resources based on patient status), that are not abstract and cannot be performed as a set of mental acts by a human. For example, a human, or even a plurality of humans, cannot efficiently integrate wireless data receipt and demodulation (which generally cannot be performed manually by a human) and detailed analysis of treatment options, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate generating an implementation design for deploying a 5G small-cell cellular network in a given geographic area, e.g., an optimized system that can maximize coverage and dominance while minimizing cost. It should be noted that the subject disclosure may be embodied in many different forms and should not be construed as limited to this example or other examples set forth herein.

Figure 2:
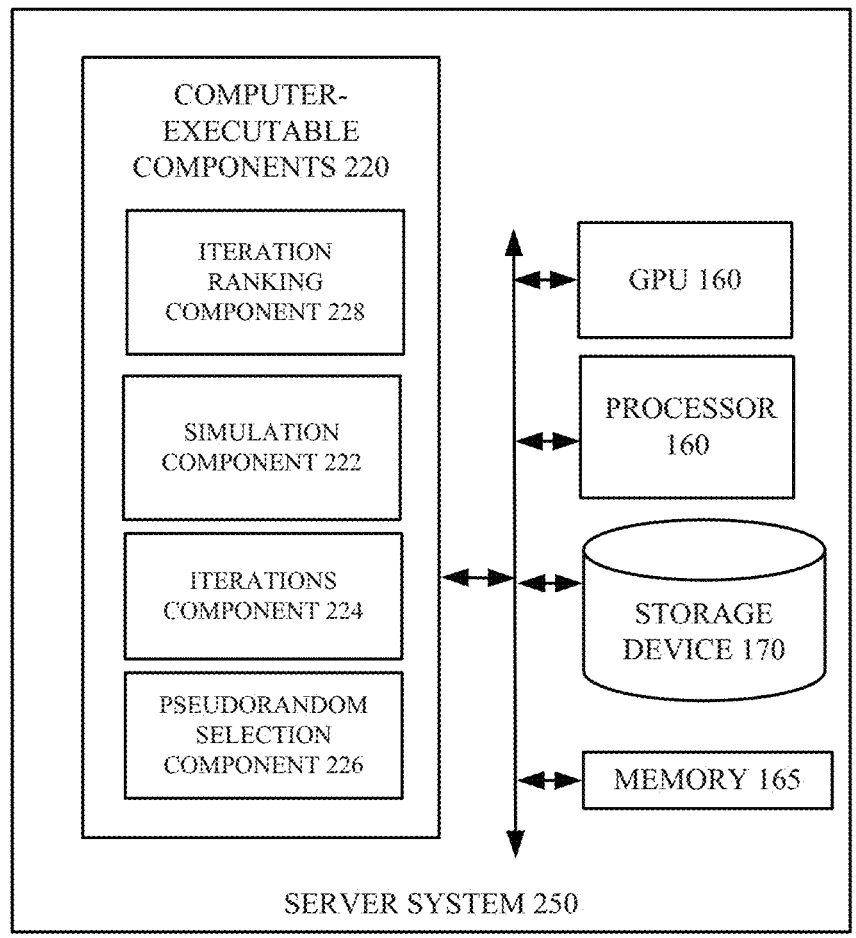
FIG. 2 is an architecture diagram of an example system that can facilitate implementation of a cellular network in a given geographic area, in accordance with one or more embodiments.

Generally speaking, FIGS. 1 and 2, respectively depict server systems communicatively linked (not shown), with a combination of components that can identify sites for placement of antennas and then simulate different iterations of antenna placement, in accordance with one or more embodiments. FIG. 1 is an architecture diagram of an example system 100 that can facilitate implementation of a cellular network in a given geographic area by identifying candidate sites for placement of antennas, in accordance with one or more embodiments. For purposes of brevity, description of like elements and/or processes employed in other embodiments is omitted.

System 100 can include server system 150, including memory 165 that can store one or more computer and/or machine readable, writable, and/or executable components 120, processor 160, storage device 170, as well as other components to implement and provide functions for system 100, and other embodiments described herein. Computer executable components 120 can include instructions that, when executed by processor 160, can facilitate performance of operations defined by the executable component(s) and/or instruction(s), e.g., siting component 122, geographic information systems (GIS) analysis component 124, as well as other components to implement and provide functions to system 100, and other embodiments described herein. It should be appreciated that the embodiments of the subject disclosure depicted in this figure and various figures disclosed herein are for illustration only, and as such, the architecture of such embodiments are not limited to the systems, devices, and/or components depicted therein. For example, in some embodiments, server system 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

It should be noted that, in the example of FIG. 1, graphics processing unit 140 is listed separately from processor 160, and this is because route different processing tasks described with one or more embodiments herein can be advantageously performed by different types of processors, e.g., specialized graphics processing units and other co-processing components. Different reasons why this is done the volume of repetitive calculations that can be used to perform tasks. With the processes discussed below, graphics processing unit 140 can analyze and rank a large number of available sites for placing antennas (e.g., as discussed with FIGS. 3-4 below), and can also perform processing tasks for the simulation of the operation of antennas in different selected iterations, e.g., discussed with FIG. 5 below.

Networks that can be facilitated by one or more implementations described herein can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like.

For example, in at least one implementation, system 100 can be used to facilitate the implementation of parts of a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

In one or more embodiments, such computer and/or computing-based elements can be used in connection with implementing one or more of the systems, devices, components, and/or computer-implemented operations shown and described in connection with FIG. 1 or other figures disclosed herein.

In one or more embodiments, memory 165 can store executable instructions 120 that, when executed by processor 160, facilitate generation of siting component 122, which can in some implementations facilitate selecting, by a device comprising a processor, a group of geographic locations for siting ones of a group of antennas, wherein the selecting results in a sited group of antennas at respective geographic locations.

In one or more embodiments, memory 165 can further store executable instructions 120 that, when executed by processor 160, facilitate generation of geographic information systems (GIS) analysis component 124 which can in some implementations facilitate selecting candidate sites for simulation from a group of available sites. For example, some embodiments can begin with geographic raster data indicating geographic elements, e.g., at a resolution of one meter. As would be appreciated by one having skill in the relevant art(s), given the description herein, geographic elements can affect the coverage area of, and quality obtained from, an antenna. Example geographic features that can be identified and utilized by one or more embodiments include, but are not limited to, terrain features such as hills and valleys, man-made features such as bridges and buildings, and potential sources of electromagnetic interference, such as other antennas, already placed. These and additional features are discussed further with FIGS. 3-5 below.

As discussed in more detail with FIG. 3 below, in exemplary embodiments, available sites for placement of antennas can be determined based on different combinations of sources, including, but not limited to, existing antenna assets (e.g., for previous network generations (4G)), known antenna placement locations where agreements have already been settled to place transmitters, In additional implementations, siting component 122, can further facilitate ranking the available sites based on selected criteria, resulting in candidate sites selected from the available group of geographic locations. Example criteria that can be used for ranking available sites include, but are not limited to, an estimated cost determined to be associated with locating an antenna at a geographic location of the available group of geographic locations. In variations to this implementation, the estimated cost of locating the antenna can include different factors, e.g., as discussed with FIG. 3 below, a distance to a connection to a backhaul network.

FIG. 2 is an architecture diagram of an example system 200 that can facilitate implementation of a cellular network in a given geographic area, in accordance with one or more embodiments. For purposes of brevity, description of like elements and/or processes employed in other embodiments is omitted.

As discussed with FIGS. 3-4 below, in one or more embodiments, memory 165 can store executable instructions 220 that, when executed by processor 160, facilitate generation of iterations component 222, which can in some implementations facilitate selecting iterations of locations for ones of the sited group of antennas for simulation, resulting in selected iterations of antenna placement locations for siting.

As discussed with FIGS. 5-6 below, in one or more embodiments, memory 165 can further store executable instructions 220 that, when executed by processor 160, facilitate generation of simulation component 222 which can in some implementations facilitate simulating respective operations of the selected iterations, wherein the simulating comprises propagation mapping with respect to respective wireless signals associated with the selected iterations, and estimating respective utilizations of the respective wireless signals. Further, memory 165 can further store executable instructions 220 that, when executed by processor 160, facilitate generation of iteration ranking component 228, which can in some implementations facilitate, based on criteria and respective results of the simulating, rank the simulated iterations of the sited It should be appreciated that the embodiments of the subject disclosure depicted in FIG. 2 and various figures disclosed herein are for illustration only, and as such, the architecture of such embodiments are not limited to the systems, devices, and/or components depicted therein. For example, in some embodiments, server system 250 can further comprise various computer and/or computing-based elements described herein with reference to operating environment 1000 and FIG. 10.

Figure 3:
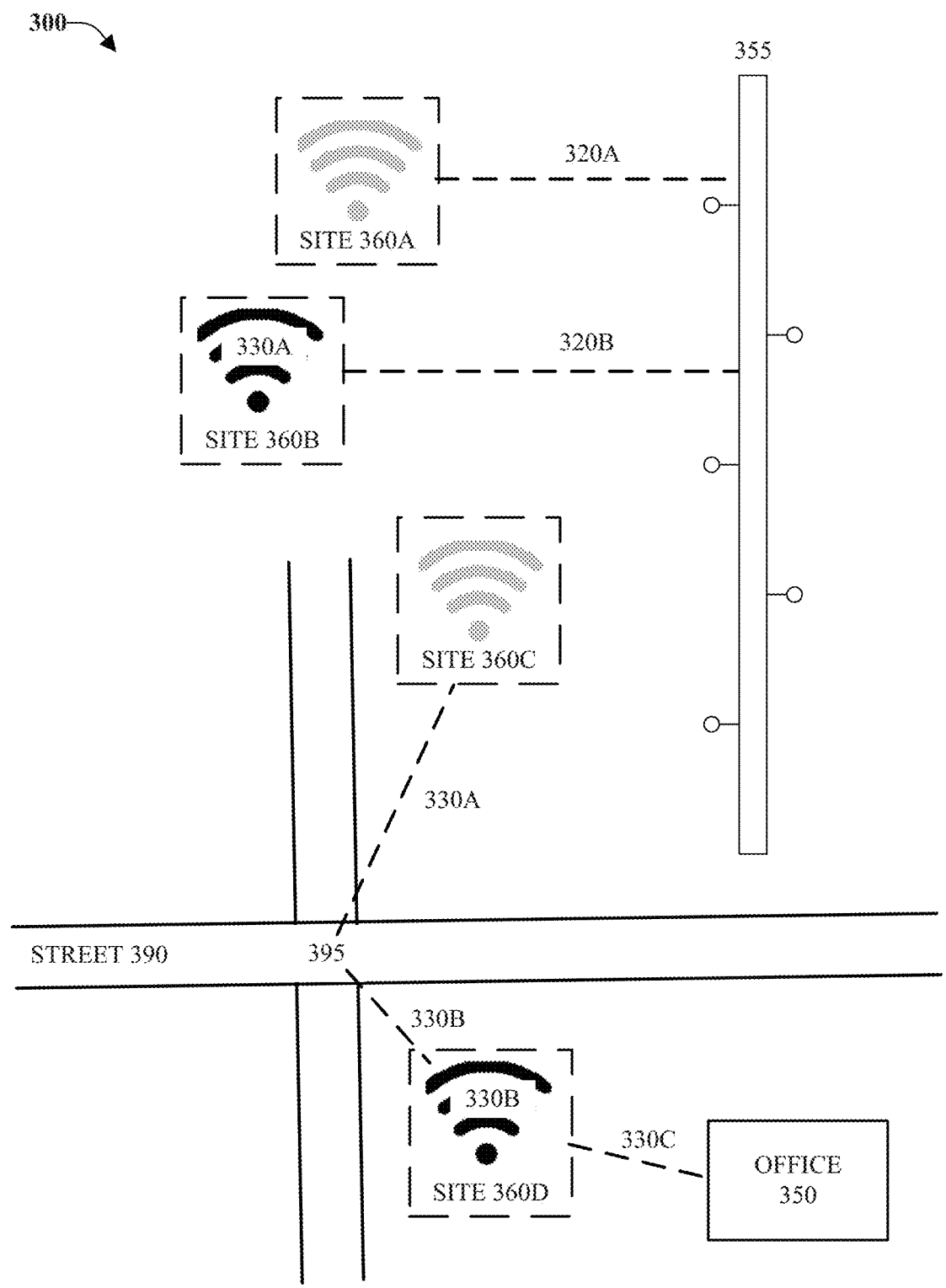
FIG. 3 is a diagram of an example layout of potential sites for placement of antennas for iterative simulation, in accordance with one or more embodiments.

FIG. 3 is a diagram of an example layout 300 of potential sites for placement of antennas for iterative simulation, in accordance with one or more embodiments. For purposes of brevity, description of like elements and/or processes employed in other embodiments is omitted. Layout 300 depicts available sites 360A-D, and existing antennas 330A-B. As noted with the discussion of FIG. 1 above, criteria that can be used to determine whether a site is selected for simulation include, but are not limited to distances 330A-C to geographic features around the sites 360B-C, e.g., street 390, intersection 395, and office 350.

Returning to the components discussed with FIGS. 1 and 2 above, in an example, one or more embodiments can utilize siting component 122 to identify candidate sites from available sites 360A-D for placement of antennas. Criteria that can be applied to available sites 360A-D to evaluate these site for potential use in later simulation processes include an example classification of available sites 360A-D into at least three categories. One category includes sites that are currently under control of the network provider, such as sites with provider antennas already placed that can be available for antenna colocation, e.g., with existing property rights and permits in place, at least for a different type of antenna. This category can, in some circumstances, be an option with a lower cost of antenna placement than other circumstances discussed below. Available sites 360B and 360D can be an examples of this type of site, with antenna 330A depicted as already being placed on the site, in contrast with available sites 360A and 360C were no antenna is placed.

Another example category of sites used to evaluate available sites can include sites similar to the previous category, but with property rights and permits in place for another network service provider. Because this approach requires securing property rights and permits for co-location with the other antennas, it can have a higher cost of placement than the previous category. Different approaches can be used to identify these sites, including receiving identified sites from other sources and analyzing satellite imagery, as noted above. Continuing the example from above, antenna 330A can be an antenna operated by another wireless network provider, while antenna 330C can be an antenna operated by the network provider utilizing embodiments described herein.

Another category of site that can be analyzed by one or more embodiments includes sites where no antennas are currently placed or legal capacity for placing any antenna has been secured. These can also be evaluated, with antenna placements costs typically exceeding the previous two categories. As noted above available sites 360A and 360C are examples of sites where no antenna is currently placed, but where it is predicted that an antenna could be placed, if needed to implement a coverage plan.

Other criteria that can be used by one or more embodiments to select sites for simulation include distances 320A-B from available sites 360A-B respectively, to network connection 355. In one or more embodiments, antennas placed at sites 360A-B can be connected to one or more communication service provider networks via one or more backhaul links, such as is depicted as network connection 355, in accordance with one or more embodiments. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. Using example criteria, available site 360A can be evaluated as having a lower backhaul connection cost than available site 360B because available site 360A is closer to network connection 355.

As noted above, other criteria that can be used to qualify an available site 360A-D to be candidate site is the relationship of a site to different geographic features. For example, available sites 360C-D have depicted respective measurements 330A-B from intersection 396 of street 390 with another street. This is an example of a proximity relationship that, if it is considered at all, can either be a positive factor for locating an antenna (e.g., potentially indicating a larger amount of wireless consumers) or a negative factor, e.g., the speed of wireless consumers may be too fast to be useful for a short-range antenna.

Another example man-made geographic feature that can be considered by one or more embodiments is office building 350. In an analysis of cost per wireless consumer served by a potentially antenna placement, this feature can be a positive factor, while in a consideration of coverage for the potential antenna placement, the obscuring potential of office 350 can be considered a negative factor.

It is important to note that the factors above and the example analysis of the factors are meant to illustrate different analysis that can be performed to select a group of candidate sites from available sites for use in subsequent operation of one or more embodiments, e.g., for iterative simulation processes discussed with FIGS. 5-6 below. Additional or fewer factors can be considered and, as discussed above, the factors can be evaluated in different ways, with significance being assessed based on different implementation specifics, e.g., type of antennas and goals of network design, such as maximizing coverage or efficiency.

Figure 4:
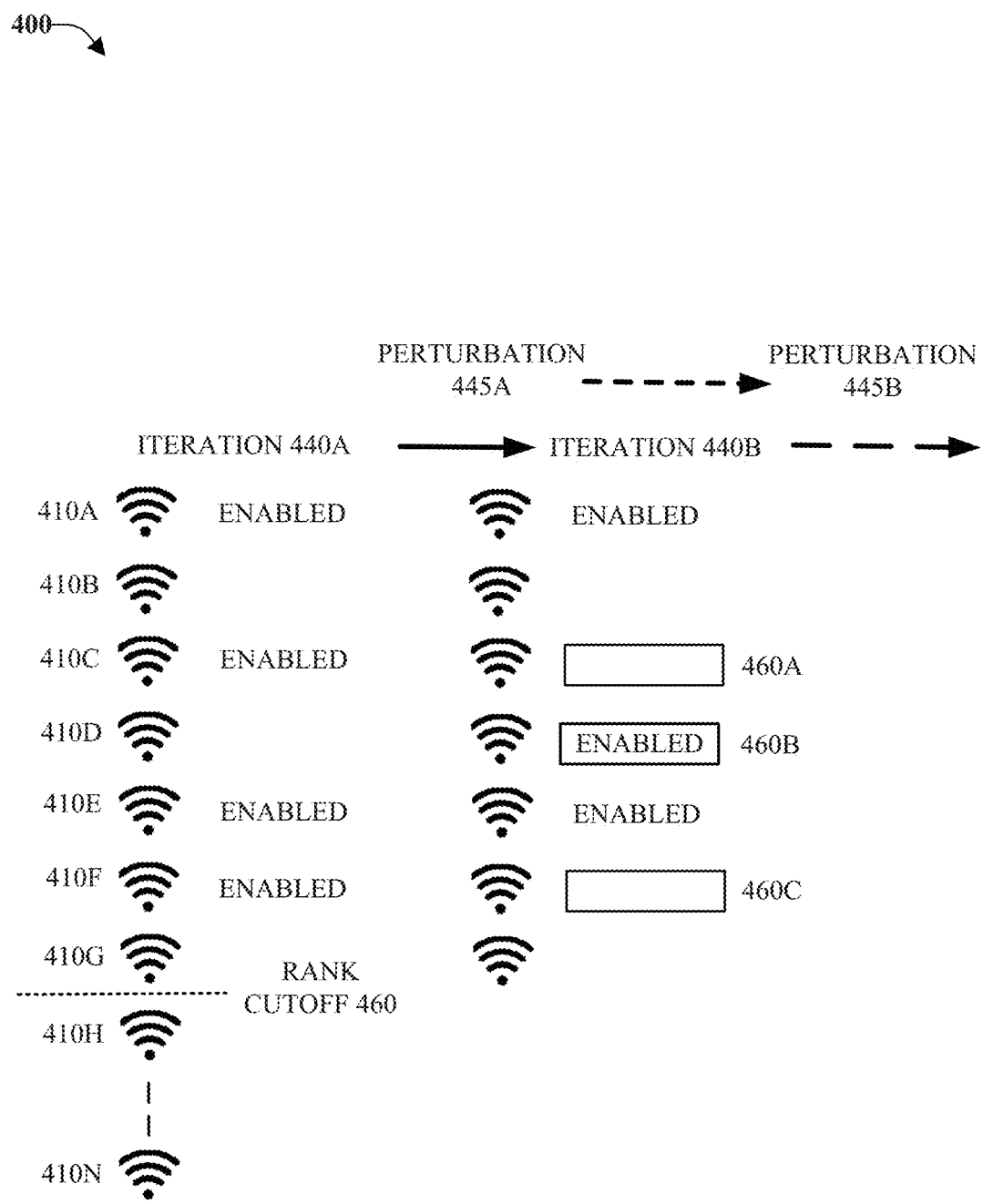
FIG. 4 depicts an illustration of selection iterations of antennas and generation of additional iterations by perturbation, in accordance with one or more embodiments.

FIG. 4 depicts an illustration 400 of selection iterations of antennas and iteration perturbation, in accordance with one or more embodiments. For purposes of brevity, description of like elements and/or processes employed in other embodiments is omitted. Illustration 400 includes iterations 440A-B of available sites 460A-N, with some sites having simulation enabled. Also illustrated, perturbations 445A-B can change which sites are activated for antenna simulation, in accordance with one or more embodiments.

Illustration 400 depicts available sites 410A-N and, after the evaluation processes described with FIG. 3 above, available sites 410A-N can be ranked, with top number of available sites being determined to be candidate sites 410A-G. Continuing the discussion of computer-executed components 220 described above, in one or more embodiments, memory 165 can further store executable instructions 120 that, when executed by processor 160, facilitate generation of siting component 122 which can in some implementations, facilitate evaluating available sites 410A-N, ranking the results, based on criteria, and applying rank cutoff 460, e.g., selecting an example seven available sites 410A-G to be candidate sites 410A-G, e.g., excluding available sites 410H-N.

In one or more embodiments, memory 165 can further store executable instructions 120 that, when executed by processor 160, facilitate generation of pseudorandom selection component 226 which can in some implementations facilitate generating iterations component 222 which can select iterations of ones of candidate sites 410A-G, resulting in selected iterations of the sited group of sites for simulating the placement of antennas. In further detail, the iterations selected by iterations component 222 can be required to be different from other selected iterations, e.g., to test a variety of placements without favoring a particular arrangements. Stated differently, each selected iteration of the selected candidate iterations can be a subgroup of the available antennas analyzed by the processes of FIGS. 1 and 3.

Different approaches can be utilized to select iterations 440A-B of candidate sites 410A-G to be simulated. In an example depicted in FIG. 4, out of candidate sites 410A-G, iteration 440A includes candidate sites 410A, 410C, 410E, 410F, and 410G. It is important to note that this example, where four of seven sites are selected by iterations component 222 for simulation is non-limiting, and illustrative, with exemplary numbers of candidate sites for a square mile zone being over one hundred sites, and with selected iterations being one hundred or less, e.g., for an example where mmWave antennas are placed within a square mile geographic area.

In one or more embodiments, simulations of antenna design iterations can occur as iterations are generated, a set number of iterations can be generated, then simulations performed one each or them, or a combination of both approaches. FIG. 4 depicts generation of iteration 440B, with modifications to the enablement of candidate sites 410A-G for simulation. As depicted, iteration 440B includes candidate sites 410A, 410D, and 410E as enabled candidate sites for simulation. It should be noted that the total number of enabled sites can change between iterations, sites can remain enabled or disabled, and enabled status can change for sites. In some example modification, candidate site 410C is disabled 460A, candidate site 410D is enabled 460B, and candidate site 410F is disabled 460C.

An example characteristic that should also be noted is the maintaining of the candidate sites 410A-G of the total available sites 410A-N depicted. In this non-limiting example, the analysis, ranking and cutoff 460 is not performed again during the generation of iterations. As with other analysis approaches described herein, variations to this approach can be implemented with embodiments, including approaches where candidate sites are modified between iterations.

In one or more embodiments, different selection approaches can be utilized to generate combinations of enabled and disabled candidate sites for simulation. In one or more embodiments, memory 165 can further store executable instructions 120 that, when executed by processor 160, facilitate generation of pseudorandom selection component 226 which can in some implementations facilitate utilizing a random approach to perturbations 445A-B, resulting in random iterations 440A-B.

Figure 5:
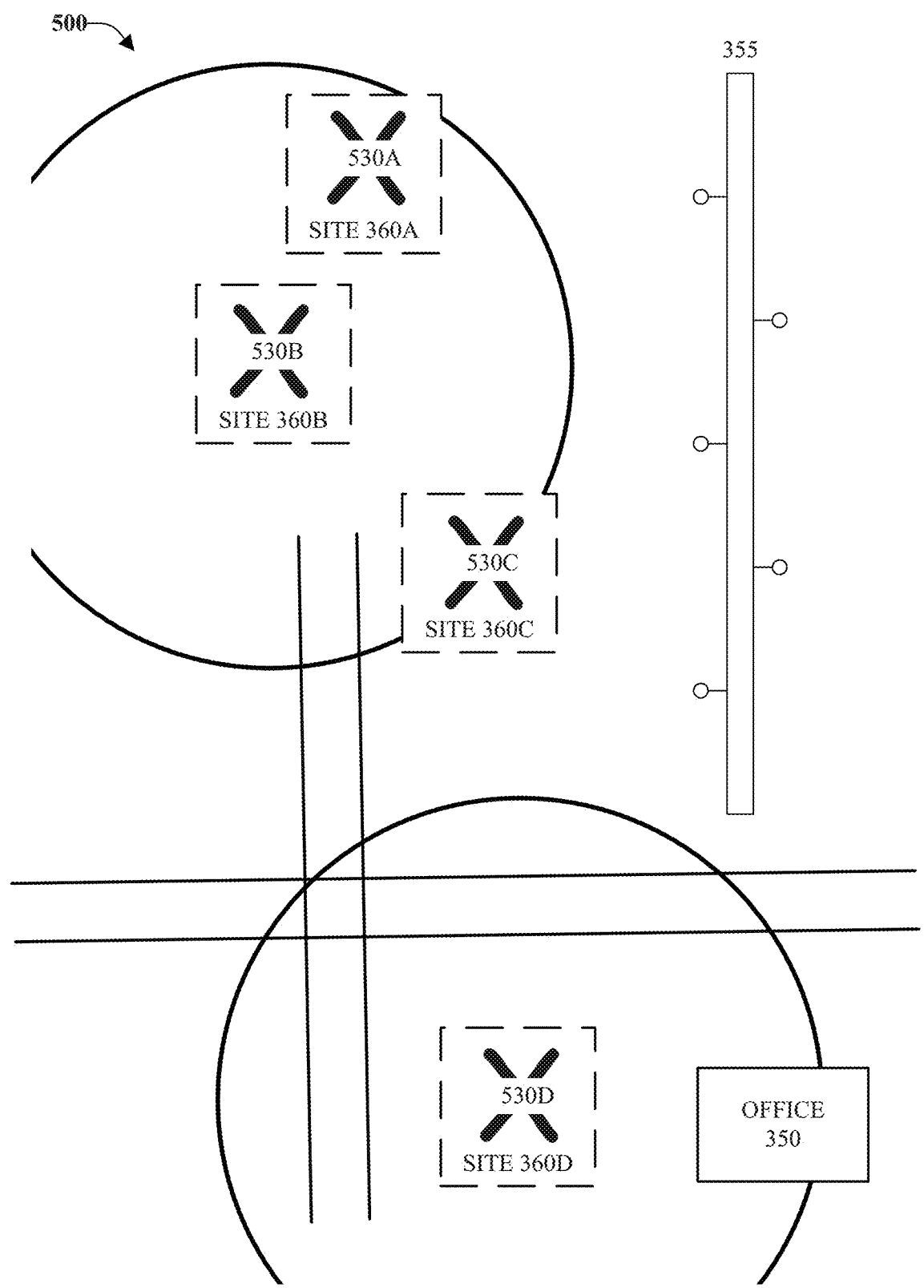
FIG. 5 is a diagram of the example layouts discussed above, with a layout having some sites enabled for simulation, and not some sites not enabled for simulation, in accordance with one or more embodiments.

FIG. 5 is a diagram of the example layouts discussed above, with layout 500 having some sites enabled for simulation, and not some sites not enabled for simulation, in accordance with one or more embodiments. For purposes of brevity, description of like elements and/or processes employed in other embodiments is omitted. As depicted, candidate sites 360A-D include capacity for simulated antennas 530A-D, respectively.

In a variation of the above approaches, in one or more embodiments, during the simulation phase the iterations ranked highest can be retained and proceed to the next round while the remaining designs are eliminated. In subsequent rounds, the best ranked iterations are subject to perturbations, and additional ranking and simulation occurs.

In one or more embodiments, iterations of antenna placement can be ranked based on one or more factors, including, but not limited to, coverage area, signal quality (non-interference), and cost. During the perturbation phase the surviving best designs are randomly transformed into new designs. These transformations by perturbation can include adding candidates, removing candidates, permuting candidates, and swapping candidates with other selected designs. After a specified number of iterations, which can depend on the size of the region and the number of candidates, the best designs can be identified.

Figure 6:
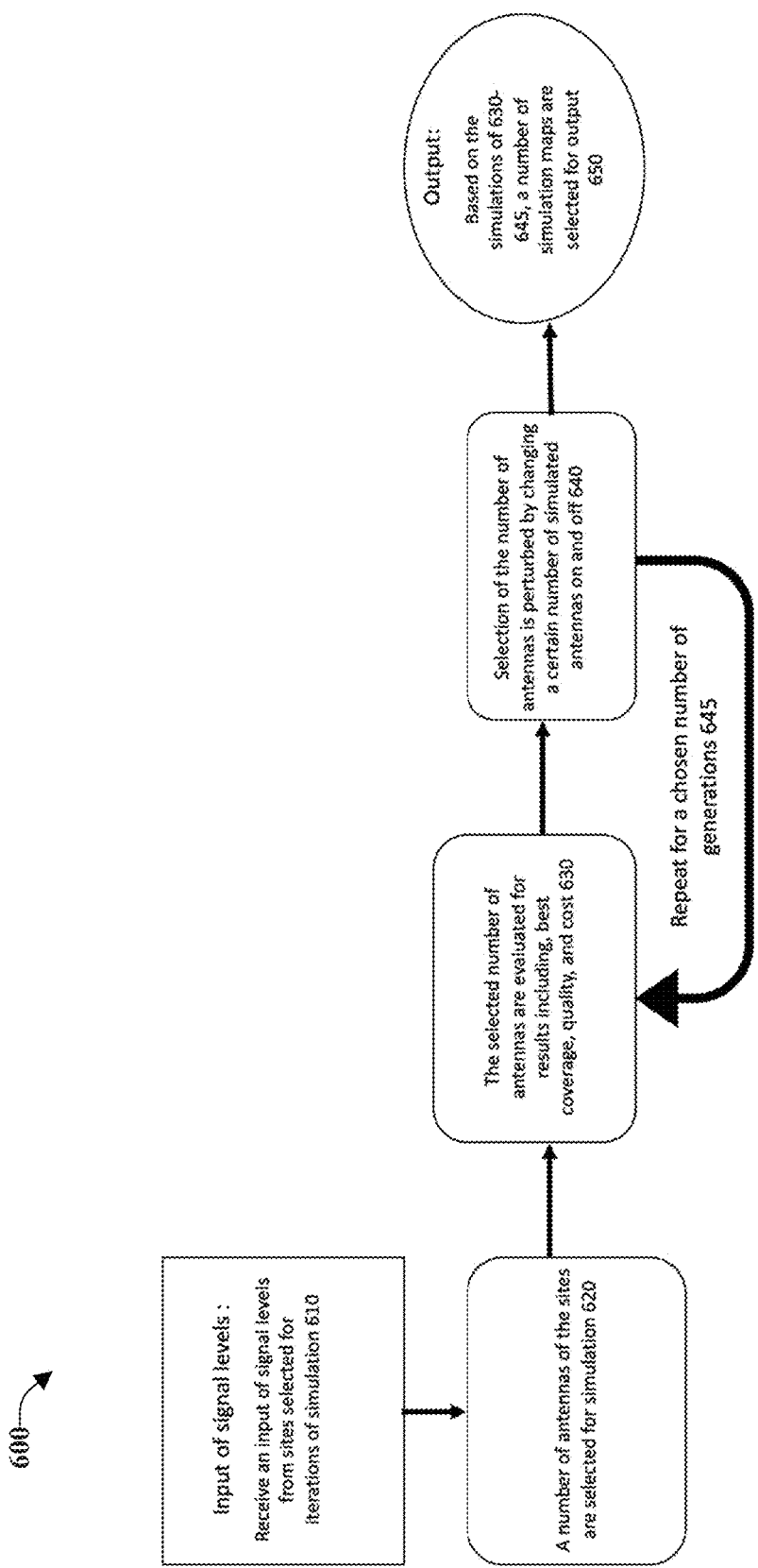
FIG. 6 depicts an example flow diagram that can facilitates an iterative simulation of a cellular network in a given geographic area, in accordance with one or more embodiments.

FIG. 6 depicts an example flow diagram 600 that can facilitate an iterative simulation of a cellular network in a given geographic area, in accordance with one or more embodiments. For purposes of brevity, description of like elements and/or processes employed in other embodiments is omitted.

At 610, flow diagram 600 receives an input of signal levels from sites selected for iterations of simulation. At 620, as discussed with FIGS. 1-4 above, a number of antennas of the sites are selected for simulation. At 630, the selected number of antennas are evaluated for results including, best coverage, quality, and cost. At 640, selection of the number of antennas is perturbed by changing a certain number of simulated antennas on and off. At 645, the simulation of 630 is repeated for a selected number of generations. At 650, based on the simulations of 630-645, a number of simulation maps are selected for output.

Figure 7:
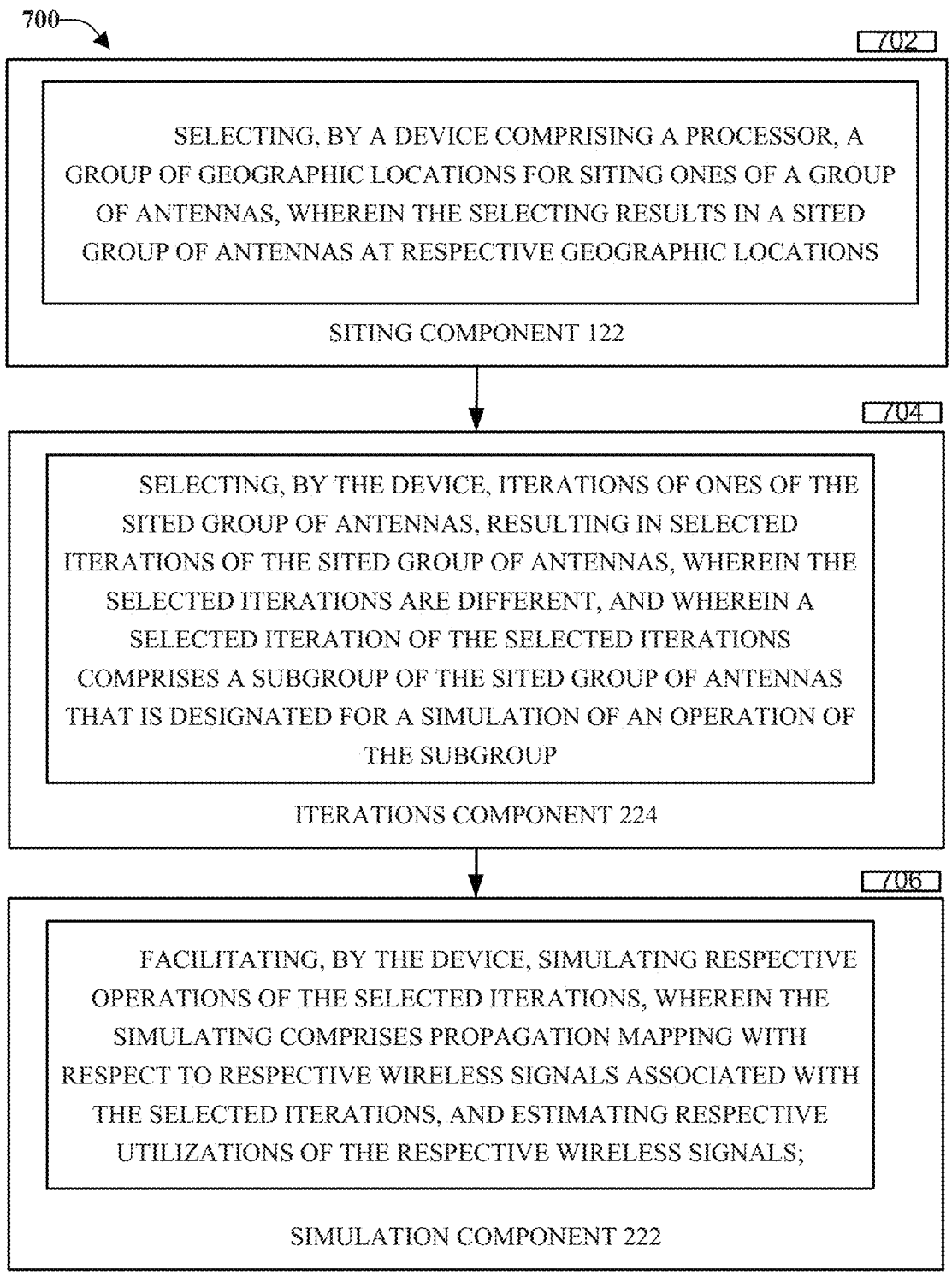
FIG. 7 illustrates an example system that can facilitate an iterative simulation of a cellular network in a given geographic area.

FIG. 7 illustrates an example system 700 that can facilitate an iterative simulation of a cellular network in a given geographic area, in accordance with one or more embodiments. For purposes of brevity, description of like elements and/or processes employed in other embodiments is omitted.

In one or more embodiments, siting component 122 can in some implementations be configured 702 to facilitate selecting a group of geographic locations for siting ones of a group of antennas, wherein the selecting results in a sited group of antennas at respective geographic locations. Further, in one or more embodiments, iterations component 124 can in some implementations be configured 704 to facilitate selecting, by the device, iterations of ones of the sited group of antennas, resulting in selected iterations of the sited group of antennas, wherein the selected iterations are different, and wherein a selected iteration of the selected iterations comprises a subgroup of the sited group of antennas that is designated for a simulation of an operation of the subgroup. Additionally, in one or more embodiments, simulation component 222 can in some implementations be configured 706 to facilitate simulating respective operations of the selected iterations, e.g., by processes including, but not limited to, propagation mapping of respective wireless signals associated with the selected iterations, and estimating respective utilizations of the respective wireless signals. Additionally, in one or more embodiments, iteration ranking component 228 can in some implementations be configured 706 to facilitate simulating respective operations of the selected iterations, e.g., by processes including, but not limited to, based on a first criterion and respective results of the simulating, ranking the selected iterations of the sited group of antennas, resulting in ranked iterations.

Figure 8:
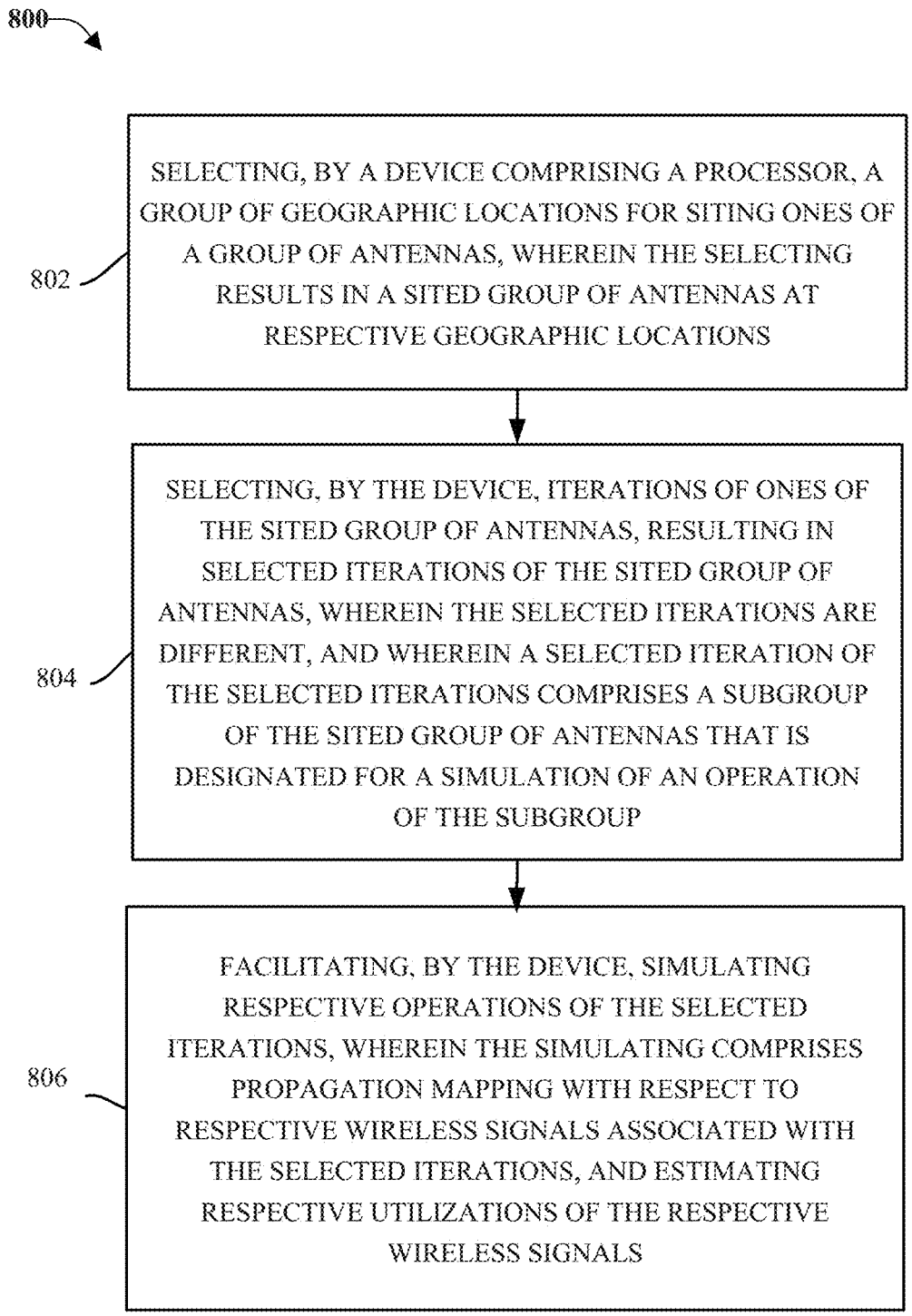
FIG. 8 illustrates a flow diagram of an example method that can facilitate iteratively simulating coverage of antennas in a cellular network for a given geographic area, in accordance with one or more embodiments.

FIG. 8 illustrates a flow diagram of an example method 800 that can facilitate iteratively simulating coverage of antennas in a cellular network for a given geographic area, in accordance with one or more embodiments. For purposes of brevity, description of like elements and/or processes employed in other embodiments is omitted. At 802, method 800 can comprise selecting, by a device comprising a processor, a group of geographic locations for siting ones of a group of antennas, wherein the selecting results in a sited group of antennas at respective geographic locations. At 804, method 800 can comprise selecting, by the device, iterations of ones of the sited group of antennas, resulting in selected iterations of the sited group of antennas, wherein the selected iterations are different, and wherein a selected iteration of the selected iterations comprises a subgroup of the sited group of antennas that is designated for a simulation of an operation of the subgroup; At 806, method 800 can comprise facilitating, by the device, simulating respective operations of the selected iterations, wherein the simulating comprises propagation mapping with respect to respective wireless signals associated with the selected iterations, and estimating respective utilizations of the respective wireless signals.

Figure 9:
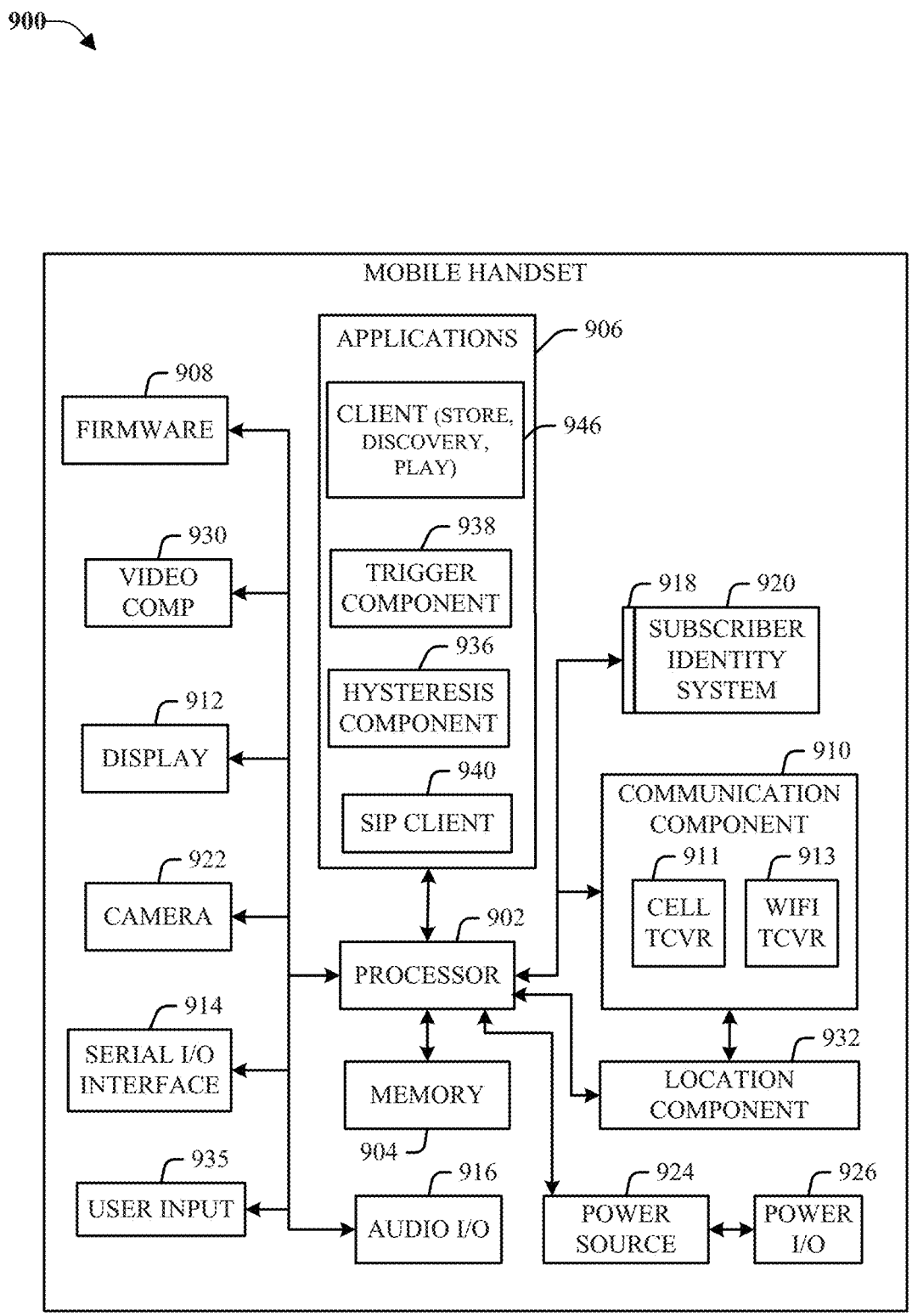
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
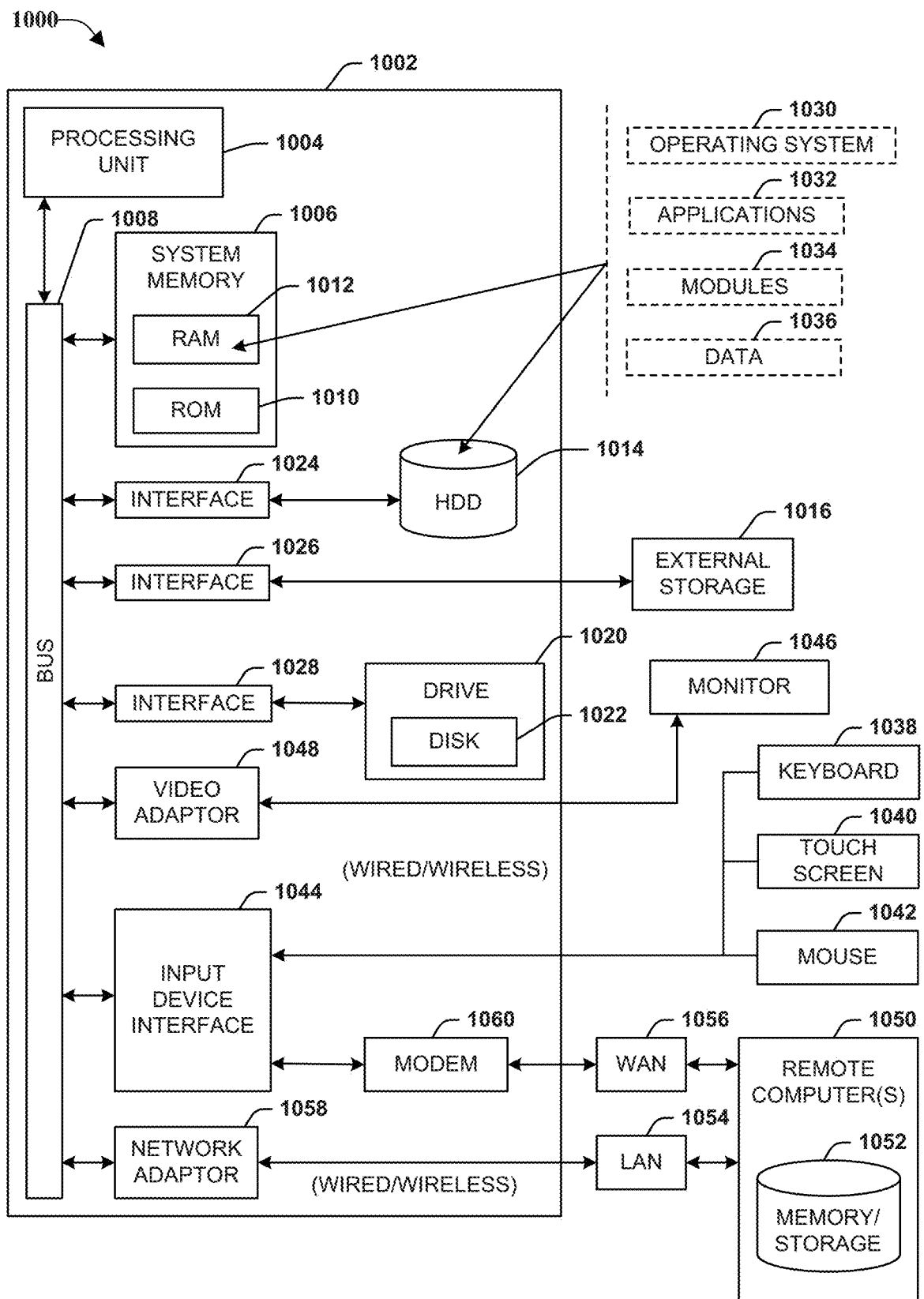
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    selecting, by equipment comprising a processor, a group of geographic locations for siting ones of a group of antennas, wherein the selecting results in a sited group of antennas at respective geographic locations;
    selecting, by the equipment, iterations of ones of the sited group of antennas, resulting in selected iterations of the sited group of antennas, wherein the selected iterations comprise different combinations of geographic locations of the group of geographic locations, and wherein a selected iteration of the selected iterations comprises a subgroup of the sited group of antennas that is designated for a simulation of an operation of the subgroup;
    facilitating, by the equipment, simulating respective operations of the selected iterations, wherein the simulating comprises propagation mapping with respect to respective wireless signals associated with geographic locations comprised in the selected iterations, and estimating respective utilizations of the respective wireless signals; and
    based on a first criterion and respective results of the simulating, facilitating, by the equipment, ranking the selected iterations of the sited group of antennas, resulting in ranked iterations.

2. The method of claim 1, wherein selecting the iterations comprises randomly selecting the iterations.

3. The method of claim 1, wherein the first criterion relates to an estimated cost of locating sited antennas of an iteration of the ranked iterations compared to an estimated utility of operating the sited antennas.

4. The method of claim 1, further comprising, based on the ranked iterations, facilitating, by the equipment, locating antennas at ones of the group of geographic locations.

5. The method of claim 1, wherein the respective geographic locations for siting the sited group of antennas comprise a subset selected from an available group of geographic locations, based on a ranking, resulting from evaluation of a second criterion, of ones of the available group of geographic locations.

6. The method of claim 5, wherein the evaluation of the second criterion comprises the evaluation of an estimated cost determined to be associated with locating an antenna at a geographic location of the available group of geographic locations.

7. The method of claim 6, wherein the estimated cost of locating the antenna comprises a distance to a connection to a backhaul network.

8. The method of claim 5, wherein the evaluation of the second criterion comprises the evaluation of an estimated value associated with locating an antenna at a geographic location of the available group of geographic locations.

9. The method of claim 1, wherein the group of antennas comprises a millimeter wave antenna of base station equipment of a cellular network.

10. First equipment, comprising:
    a processor; and
    a memory that stores executable instructions that, when executed by the processor, facilitate performance of operations, comprising:
        receiving, from second equipment, information corresponding to iterations of ones of a sited group of antennas, wherein the iterations were generated by the second equipment by selecting the iterations of the ones of the sited group of antennas, resulting in selected iterations of the sited group of antennas, wherein the selected iterations comprise different combinations of geographic locations of the group of geographic locations, and wherein a selected iteration of the selected iterations comprises a subgroup of the sited group of antennas that is designated for a simulation of an operation of the subgroup;
        simulating respective operations of the selected iterations, wherein the simulating comprises propagation mapping with respect to respective wireless signals associated with geographic locations comprised in the selected iterations, and estimating respective utilizations of the respective wireless signals; and
        based on a first criterion and respective results of the simulating, facilitating ranking the selected iterations of the sited group of antennas, resulting in ranked iterations.

11. The first equipment of claim 10, wherein the iterations were generated by the second equipment based on random selection.

12. The first equipment of claim 10, wherein the first criterion comprises an estimated cost of placing the sited antennas of the ranked iterations compared to an estimated utility of the operation of the sited antennas of the ranked iterations.

13. The first equipment of claim 12, wherein the estimated cost comprises a distance to a connection to a backhaul network.

14. The first equipment of claim 10, wherein the operations further comprise, based on the ranked iterations, facilitating locating antennas at geographic locations corresponding to sites simulated for the antennas.

15. The first equipment of claim 10, wherein the sited group of antennas comprises a subset of a second group of geographic locations, wherein the subset was selected based on a second criterion, and wherein the second group of geographic locations comprise geographic locations capable of hosting an antenna.

16. The first equipment of claim 10, wherein the sited group of antennas comprise an antenna to be employed by network equipment of a fifth generation radio access network.

17. A non-transitory machine-readable medium, comprising executable instructions that, when executed by a processor of a system, facilitate performance of operations, comprising:

selecting a group of geographic locations for siting ones of a group of antenna equipment, wherein selecting results in a sited group of antenna equipment at respective geographic locations;

randomly selecting iterations of ones of the sited group of antenna equipment, resulting in selected iterations of the sited group of antenna equipment, wherein the selected iterations comprise different combinations of geographic locations of the group of geographic locations, and wherein a selected iteration of the selected iterations comprises a subgroup of the sited group of antenna equipment that is designated for a simulation of an operation of the subgroup;

facilitating simulating respective operations of the selected iterations, wherein the simulating comprises propagation mapping with respect to respective wireless signals associated with geographic locations comprised in the selected iterations, and estimating respective utilizations of the respective wireless signals; and based on a criterion and respective results of the simulating, facilitating ranking the selected iterations of the sited group of antenna equipment, resulting in ranked iterations.

18. The non-transitory machine-readable medium of claim 17, wherein the criterion comprises an estimated utility of placing an antenna of the group of antenna equipment at a geographic location.

19. The non-transitory machine-readable medium of claim 17, wherein an antenna of the group of antenna equipment comprises millimeter wave antenna equipment of base station equipment of a mobile cellular network.

20. The non-transitory machine-readable medium of claim 17, wherein the operations further comprise, based on the ranked iterations, facilitating locating antenna equipment at geographic locations.

* * * * *